US008239641B2

(12) United States Patent
Apacible et al.

(10) Patent No.: US 8,239,641 B2
(45) Date of Patent: Aug. 7, 2012

(54) CHOOSING LOCATION OR MANNER OF STORING DATA

(75) Inventors: Johnson T. Apacible, Mercer Island, WA (US); Mark A. Nikiel, Redmond, WA (US); Cezary Marcjan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 525 days.

(21) Appl. No.: 12/391,482

(22) Filed: Feb. 24, 2009

(65) Prior Publication Data

US 2010/0217612 A1    Aug. 26, 2010

(51) Int. Cl.
*G06F 12/00* (2006.01)

(52) U.S. Cl. .......... 711/154; 711/100; 711/165; 706/12; 706/47; 713/189; 713/193

(58) Field of Classification Search .................. 711/100, 711/154, 165; 706/12, 47; 713/189, 193
See application file for complete search history.

(56) References Cited

U.S. PATENT DOCUMENTS

| | | | |
|---|---|---|---|
| 2004/0143457 | A1 | 7/2004 | Demirian et al. |
| 2004/0199782 | A1 | 10/2004 | Arnold |
| 2005/0209893 | A1 | 9/2005 | Nahra et al. |
| 2008/0140572 | A1 | 6/2008 | Jackson |
| 2009/0094423 | A1* | 4/2009 | Bondurant et al. ........... 711/161 |
| 2010/0017441 | A1* | 1/2010 | Todd ............................ 707/200 |
| 2010/0312646 | A1* | 12/2010 | Gupta et al. ............... 705/14.58 |

OTHER PUBLICATIONS

Weaver, et al., "Federated, Secure Trust Networks for Distributed Healthcare IT Services", retrieved at <<http://ieeexplore.ieee.org/stamp/stamp.jsp?arnumber=01300264>>, IEEE, Publication Date: Aug. 21-24, 2003, pp. 162-169.

Donno, et al., "The Use of Grid Storage Protocols for Healthcare Applications", retrieved at <<http://cdsweb.cern.ch/record/1138455/files/HEALTHINF_2009_103_CR_.pdf>>, Nov. 3, 2008, 4 pages.

"Better Information, Better Care, Better Health", retrieved at <<http://h71028.www7.hp.com/enterprise/downloads/Healthcare%20Information%20Value%20to%20Providers.pdf>>, Jul. 2007, 18 pages.

"National Committee on Vital and Health Statistic", retrieved at <<http://www.ncvhs.hhs.gov/061003p1.pdf>>, Sep. 20, 2006, pp. 1-37.

Sion, et al., "Regulatory-Compliant Data Management", retrieved at <<http://www.vldb.org/conf/2007/papers/tutorials/p1433-sion.pdf>>, Sep. 23-28, 2007, Vienna, Austria, pp. 1433-1434.

Kargl, et al., "Security, Privacy and Legal Issues in Pervasive e-Health Monitoring Systems", retrieved at <<http://ieeexplore.ieee.org/stamp/stamp.jsp?arnumber=04570189>>, 7th International Conference on Mobile Business, IEEE, Publication date: Jul. 7-8, 2008, pp. 296-304.

* cited by examiner

*Primary Examiner* — Jasmine Song (57) ABSTRACT

Data may be stored in a location or manner that takes various considerations into account. Examples of such considerations are the availability, speed and cost of storage resources, and commercial and regulatory expectations concerning the reliability, security, and/or availability of the stored data. When a piece of data is to be stored, a storage choice component may take the above-considerations into account in order to determine where the data is to be stored, how many copies of the data are to be made, whether the data is to be encrypted, and/or other issues. Additionally, a migration engine may re-evaluate data that has already been stored in order to determine whether the data may be migrated to other storage resources, and/or whether changes may be made with regard to issues such as the encryption level and/or the number of stored copies of the data.

20 Claims, 5 Drawing Sheets

CHOOSING LOCATION OR MANNER OF STORING DATA

BACKGROUND

In large scale computing and data storage systems, one issue that arises is where to store data. Different types of data storage may have different costs or retrieval speeds. When storage devices are geographically distant from the source or consumer of the data, there may be issues concerning the availability of bandwidth to transmit the data to these distant locations. When there are many storage devices available, there may be issues of balancing usage across the various devices to avoid placing an excessive load on any one device.

Additionally, regulatory issues and commercial expectations may affect where and how data is stored. These regulatory or commercial factors may govern how many copies of the data are to be stored, what type of security is to be applied to the data, where (geographically) the data may be stored, how fast the storage facility is expected to respond to retrieval requests, or any other aspect of data storage. For example, the manner in which medical records are stored is often governed by national laws. Such laws may specify that a certain type of encryption is to be used to protect the data, and that a certain number of copies of the data are to be kept.

SUMMARY

The choice of where and how to store data may be made in a way that takes various factors into account. The factors to be considered may be driven by the availability and/or capability of different storage resources, commercial expectations, and/or regulatory issues. Examples of factors that may be take into account include the cost of a particular form of storage, the cost and/or time of retrieving the data, the number of copies to be stored of the data, the geographic location(s) in which data is to be stored, load balancing among storage devices, the level of encryption expected by a customer or by a regulatory framework, whether the data is to be stored in a structured or unstructured form, or any other factors.

When data is to be stored, an application (or a component thereof, such as the mid-tier service of a web application) may communicate with a component that determines where to store the data. That component may determine (possibly through the use of a rules engine) where the data is to be stored based on various considerations such as those mentioned above. The component may also determine whether and/or how the data is to be encrypted, and how many copies of the data are to be stored. Once the choice has been made as to where and/or how to store the data, the data is written to the chosen location(s). Additionally, if encryption is to be applied, then it may be applied using whatever parameters (e.g., key strength, encryption algorithm, etc.) have been specified by the component.

While the component may apply rules to determine where and how data is to be stored initially, it may also use rules to determine where and how data is to be moved during the data's life cycle. For example, the rules might specify that new data is to be stored in devices that offer fast retrieval, but old data may be stored in slower devices (which may be less expensive to use). Or, the number of copies of data to be stored may decrease as the data ages, thereby allowing some copies to be destroyed as time progresses. A migration engine may determine, based on rules similar to those described above, when data may be migrated and/or destroyed.

A component that determines where and how to store data may use machine learning techniques to determine how to make future choices. For example, if the data to be stored is medical data, the component might learn—through observation of usage patterns—that X-rays are rarely accessed after they are some number of years old. Thus, such X-rays might be migrated, after some number of years, to cheaper storage that provides slower retrieval—if such migration is permitted by commercial and/or regulatory expectations.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

There are various types of data storage resources, and various ways in which data may be stored. Examples of different types of storage resources include disk, tape, and semiconductor devices. These different types of resources have different costs and capabilities. For example, tape storage is cheap, but the latency time to retrieve the data from tape may be long. Most semiconductor memories offer fast retrieval, but are expensive relative to the volume of data they can store. Disks have a cost and retrieval time that is somewhere between tape and semiconductor devices. And, for any given type of storage resource, there may be many different variations. For example, different kinds of disks or disk arrangements are often associated with different speeds and costs.

Moreover, even for a given type of storage resources, there are various choices that may be made about how to store the data. For example, data may be stored in an encrypted or non-encrypted format. Different types of encryption algorithms, or different strengths of keys may be used. Structured data may be stored in a format that respects its structure, or it may be flattened to a non-structured format. It is generally more expensive to store data in a structured format, but such storage allows the structure to be accessed more easily upon retrieval. When structured data has been flattened (e.g., when hierarchical data is flattened to allow storage in a relational database), the structure can generally be re-constituted from the flat information, but re-constitution of the structure is computationally expensive. Some kinds of data call for a certain number of copies to be stored in geographically diverse locations in order to prevent data loss, and the different copies may be stored using different types of resources.

None of the above considerations are reasons to prefer, universally, one type of storage over another. Rather, the particular type of storage chosen generally depends on circumstances surrounding the data. For example, some type of data (e.g., medical records) call for a high level of security and fast retrieval. Other types of data (e.g., game high scores) might tolerate a lower level of security and slower retrieval. The type of storage called for may depend on regulatory and/or commercial expectations. For example, the national laws of a particular country might call for medical data to be stored with a certain level of encryption, and for a certain number of copies to be stored in geographically diverse locations to guard against loss in the event of a disaster such as a fire or earthquake. Even if such laws specify that that copies are to be stored in geographically diverse locations, the laws might also limit the storage to certain regions of the world. On the other hand, a company that offers a video game on a web site might assume that interest in the game will have a relatively short life cycle and that the loss of players' high score data—while embarrassing to the company that lost the data—does not justify the cost of keeping a large number of high-security copies of the data. In other words, where and how to store data is a decision that may be made to fit the particular circumstances surrounding the data.

The subject matter described herein provides ways to determine where and how to store data. When an application seeks to store data, the application may consult a storage choice component. That component may choose the particular location(s) in which to store the data, and other parameters concerning the storage of data (e.g., encrypted/non-encrypted, structured/non-structured, etc.), based on a set of rules. For example, the rules may determine that particular kinds of data (e.g., files containing images of X-rays) are to be stored under strong encryption using a particular encryption algorithm, and that three copies are to be stored in locations that are at least one hundred miles apart from each other. In order to ensure availability of the data, the rules might call for the data to be stored in at least one place that can respond to retrieval requests quickly (e.g., a disk-based file server that can respond to a retrieval request within one second), but might allow the other copies to be stored on slower, cheaper media (e.g., tapes). The rules may specify which types of resources provide the different characteristics. For example, the rules might specify the speed and/or costs that are offered by various storage devices, so that appropriate devices can be chosen for a given situation. Moreover, some of the rules might be derived from actual usage information, and might change in real-time. For example, if a particular device has become overloaded, then the rules might evolve to direct newly-collected or newly-generated data away from that device. Additionally, some rules could be learned through machine-learning techniques. For example, observation of data usage patterns might reveal that certain types of data are rarely accessed after they are stored, and thus such data might be stored in slower, cheaper devices, or in a flattened format, in order to save cost and/or to free up the fast, expensive resources for data that is more likely to be accessed.

Considerations, such as those described above, may be used to make an initial determination about where to store data, but may also be used to determine whether and/or how to change the storage of data over time. For example, the likelihood of a record's being accessed may decrease as the record ages, thereby allowing the data to migrate from structured storage in fast, expensive equipment, to flat storage on slower, cheaper equipment.

The foregoing provides some examples, although in general any considerations could be used to determine where and/or how to store data, or what subsequent changes may be made to that storage.

Figure 1:
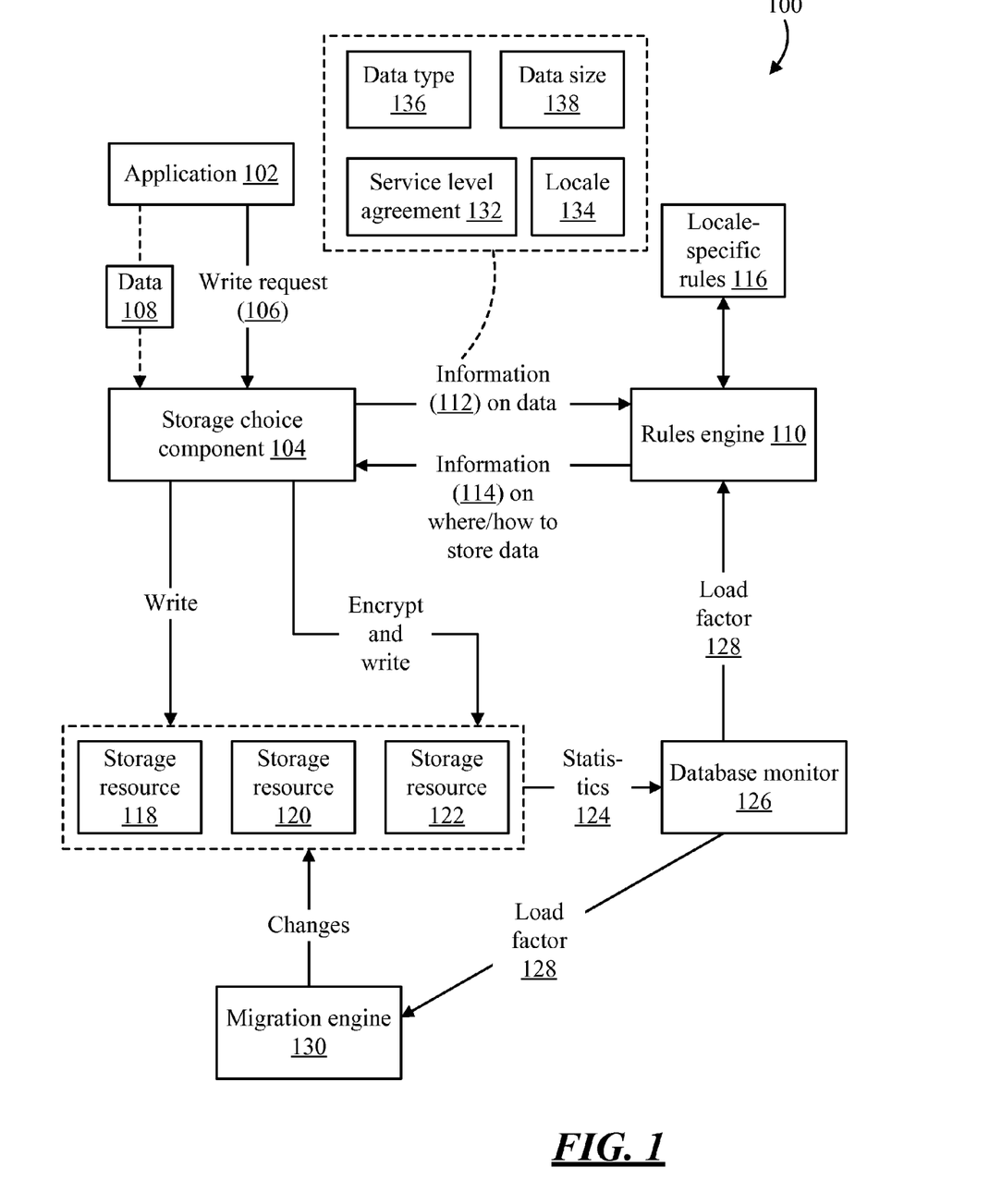
FIG. 1 is a block diagram of an example arrangement in which data may be stored and/or migrated.

Turning now to the drawings, FIG. 1 shows an example arrangement 100 in which data may be stored and/or migrated. Application 102 is a program that generates and/or collects data to be stored. For example, application 102 may be a medical records application that allows health care providers and/or patients to store and/or retrieve medical records. Application 102 may, for example, be the mid-tier service of a web application. Thus, there may be a cluster of web servers that provide front-end software to interact with users through browsers or other types of clients. This front-end software may collect data from users, and application 102 may be a mid-tier service that acts on the data that the front-end software has collected. While application 102 may be such a mid-tier service as described above, in general application 102 could take any form. In greater generality, application 102 is merely an example of a source that generates and/or collects data, and that may issue a request to store that data.

Storage choice component 104 determines where and how to store data provided by application 102. For example, application 102 may generate a write request 106, which seeks to store some data 108 in an appropriate place. Application 102 may not know where or how the data is to be stored, and may instead leave this choice to storage choice component 104.

In order to choose an appropriate place (or places) to store data, and an appropriate manner in which the data is to be stored, storage choice component 104 may make use of rules engine 110. Arrangement 100 shows an example in which storage choice component 104 communicates with rules engine 110 as a separate component, although—as an alternative example—rules engine 110 may be part of storage choice component 104.

Storage choice component 104 may provide, to rules engine 110, information 112 concerning the data 108 to be stored. Examples of such information include a service level agreement 132, a locale 134 from which the data originates, a type 136 of the data, or a size 138 of the data. Service level agreement 132 may be the agreement that the operator of arrangement 100 maintains with the entity on whose behalf the data is being stored. That agreement may specify aspects of data storage such as the number of copies to be stored, the level of encryption to be applied, geographic restrictions on storage of the data, etc. These aspects may originate from legal regulations or commercial standards, or simply mat be a choice made by the owner of the data. The locale 134 from which the data originates may be used by rules engine 110 in the sense that different locales may have different rules regarding the storage of data. (The use of locale-specific rules is described below.) The type 136 and/or size 138 of the data may also be provided to rules engine 110, since different resources might be used to store data having different types or sizes.

In response to information 112, storage choice component 104 may receive back, from rules engine 110, information 114 that describes where and/or how to store data 108. Storage choice component 104 may then cause data 108 to be stored in the place and/or manner identified by rules engine 110.

Rules engine 110 may determine where and/or how to store data based on various factors. One example factor that rules engine 110 may use is a set of locale-specific rules 116. Locale-specific rules 116 may represent local regulations and/or laws, which indicate how certain types of data are stored. For example, as mentioned above, one type of data that may be stored, and that may be subject to legal constraints, is medical data. Locale-specific rules could indicate where and/or how such medical data is to be stored based on where the data originates. For example, if the national law of the United States calls for medical data to be stored in the United States under 128-bit encryption, this fact might be stated in locale-specific rules 116. Or, the laws of the European Union (EU) might permit medical data originating in any EU country to be stored in any EU country, but not in countries outside of the EU. Locale-specific rules 116 may include these types of constraints on the storage of data, and rules engine 110 may apply these types of constraints in determining where or how data is to be stored.

Once storage choice component 104 has received information 114 indicating where and/or how data 108 is to be stored, storage choice component 104 may cause data 108 to be stored in the appropriate place(s) and or manner. Storage resources 118, 120, and 122 are examples of places where data could be stored. Arrangement 100 contains three example storage resources 118-122, although there could be any number of storage resources. Storage resources 118-122 may be specific devices. For example, storage resource 118 might be a tape drive, and storage resource 120 might be a disk drive (or they might be computers that employ a tape drive and a disk drive, respectively, to store data). Or, as another example, storage resources 118-122 might be data centers that provide various types of storage devices. Storage resources may have different cost and capability profiles—e.g., storage resource 118 might be cheap and slow, and storage resource 120 might be expensive and fast. The cost and speed (and other factors) may come from various different aspects of the storage resources. For example, storage resource 118 might be cheap because it is an old, slow machine, and storage resource 120 might be expensive because it is a new, fast machine. Or, storage resource 118 might be cheap and slow by virtue of being located in an inexpensive part of the world where only a low-bandwidth data connection is available, and storage resource 120 might be expensive because it is located in a high-priced part of the world where it is served by a high-bandwidth data connection and is close to producers and consumers of data.

In addition to cost and speed, different storage resources may be associated with other features. For example, one storage resource might be an encrypted database, while another one is a clear database. Or, one storage resource may be a relational database that stores information in flat tables, while another storage resource may implement a hierarchical database that stores data in a structured form. Moreover, different storage resources could be located in different parts of the world, thereby providing geographic diversity (which either regulatory or commercial expectations may call for in the storage of different copies of data, in order to guard against data loss in the event of a disaster).

When data is stored in the various storage resources 118-122, statistics 124 may be collected regarding the stored data. Examples of such statistics include the load on each storage resource, the latency involved in accessing stored data, the capacity of each storage resource and the percentage of each resource's capacity that is being used, the frequency with which data (or specific types of data) are being retrieved, or any other statistics on usage. Statistics 124 may be sent to database monitor 126. Database monitor 126 may receive and collect these statistics (possibly on a recurring basis), and may generate a load factor 128, indicating the various aspects of the usage. Load factor 128 may be sent to rules engine 110, so that rules engine 110 may consider load factor 128 in determining where to store data. Load factor 128 may take the form of a vector, which contains values representing various aspects of the storage resources' load. For example, one value in the vector might represent a resource's responsiveness to access requests, another might represent the amount or percentage of storage space available at that resource, another might represent the level of security available at that resource, and so on.

Rules engine 110 may use load factor 128 as part of the decision as to where to store data. For example, when application 102 requests to store data 108, rules engine 110 may determine that storage resource 118 is a good place to store the data, but—based on load factor 128—may also determine that storage resource 118 is near capacity and has shown a high latency in responding to requests. Thus, based on load factor 128, rules engine 110 may avoid choosing storage resource 118 as a place to store data 108, and may instead choose storage resource 120 in order to balance the usage of different storage resources.

Once data has been placed in one or more storage resources, the data may or may not stay there. Migration engine 130 determines whether, and how, to change the storage of data after it has been stored in storage resources. Migration engine 130 may consider various factors in determining whether to change the storage of data. For example, migration engine 130 may receive and consider load factor 128 in order to determine whether the current storage of the data is meeting the objectives of the storage (e.g., retrieval time, security, etc.). Migration engine 130 may move data from one storage resource to another in various circumstances. For example, one resource may have become overloaded (which may be determined, for example, based on load factor 128), in which case migration engine 130 may move the data from that resource to a resource that is not as heavily loaded. Additionally, migration engine 130 may change the storage of data based on factors related to the data's age. As noted above, certain types of data may be accessed less frequently as they age (e.g., old X-rays may be less likely to be accessed than new X-rays), so data that was stored in fast, expensive devices could be stored in slow, cheap devices as the data ages. Migration engine 130 could be used to accomplish this move from the fast, expensive devices to the slow, cheap devices. Additionally, as data ages, the tolerance for loss might increase so the number of copies stored could be reduced, or old data could be destroyed altogether. Migration engine 130 could be used to destroy or delete one, some, or all copies of data. (Deletion of data could take the form of reversible (temporary) deletion, or permanent destruction. E.g., migration engine could reversibly delete data by keeping the data while setting a "delete" flag on the data, or could irreversibly destroy the data by removing it from storage media and/or destroying the decryption key for that data. Migration engine could carry out a deletion and/or destruction schedule that is specified by law, by a service level agreement, or by any other commercial and/or regulatory expectations.) As migration engine 130 changes the place(s) and/or ways in which data are stored, migration engine 130 may do so while making sure that the various constraints on the storage of data are satisfied. For example, migration engine 130 might determine that old X-rays are not accessed frequently and that money could be saved by storing them in slow, cheap devices, but regulatory expectations may call for the X-rays to be stored in devices that meet certain parameters for speed, security, etc., which might not be met by the slow, cheap device. In such a case, the regulatory framework may take precedence over other considerations, and migration engine 130 could take such considerations into account in determining which data to migrate.

The places in which data are to be stored initially (or to which the data are to be migrated at a later point in time) may be determined, in part, by learning from past experience. For example, as database monitor 126 collects information about the state of the various data storage resources, that information may be provided to a machine learning algorithm, which may tune the parameters that are used to make choices about data storage. For example, a formula may determine where to store data (e.g., in a fast device or a slow device) based on the age of the data. Under the formula, a particular parameter may determine what age of data is the cutoff being storing the data in a fast device or a slow device (e.g., the cutoff might be five years of age, in which case data that is five years old or less might be stored in a fast device, and older data might be stored in a slow device). Database monitor 126 may collect information that indicates when data is accessed and how old the data is when it is accessed. The information collected by database monitor 126 may suggest that setting the decision point at five years generates certain cost savings (by making use of slow, cheap machines), but also imposes certain costs (by causing access requests for data that is more than five years old to take considerable time). Given some criteria regarding the cost/time tradeoff, a machine learning algorithm might use the information collected by database monitor 126 to adjust the age at which data is moved from the fast device to the slow device. For example, a machine learning algorithm might determine that the increase in time to access old data is a detriment that is not offset by the cost savings from using a cheaper storage resource, so it might increase the age at which data is migrated to the slow device from five years to six years. Various scenarios are possible, but in general a machine learning algorithm may attempt to optimize the way in which data storage decisions are made based on an analysis of the storage and usage of existing data.

As explained above, database monitor 126 may collect statistics about data and the various storage resources so that those statistics can be used to direct where new data is to be stored and to migrate or delete old data. However, database monitor 126 may also collect statistics that may be used to audit transactions involving the data. For example, events that create data, delete data, migrate data, access data, etc., may be recorded by database monitor 126, and that information may be stored as part of an audit trail, so that the way in which data was handled could be forensically verified. Statistics 124 could include this type of event information for later using in auditing.

Figure 2:
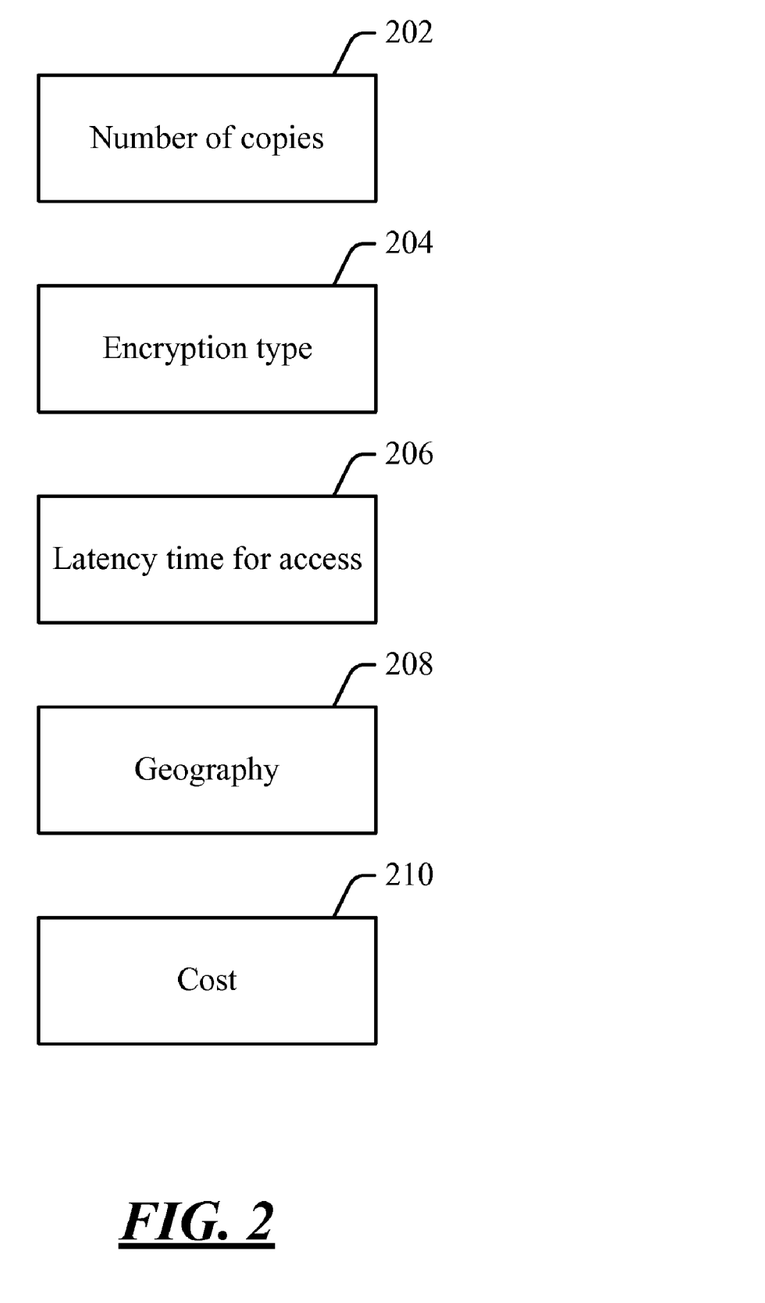
FIG. 2 is a block diagram of examples of the different places and different ways in which data may be stored.

As noted above, storage choice component 104 may determine where and/or how to store data 108. FIG. 2 shows examples of the different places and ways in which a storage choice component may choose to store data.

One example aspect of storing data is the number of copies to be stored (block 202). For example, commercial expectations, regulatory policy, etc., may call for some minimum number of copies of the data to be stored. A storage choice component may determine, based on these considerations or others, how many copies of the data are to be stored.

Another example aspect of storing data is the type of encryption (if any) to be used (block 204). In certain cases, the data may be stored without encryption (in the clear). In other cases, a decision may be made to use encryption, where that decision may include a choice of a particular type of encryption to be used. The type of encryption may include a particular choice of encryption algorithm, a key length, or any other aspect of the encryption. The choice of encryption could be driven by factors such as those mentioned above—e.g., commercial expectation, regulatory policy, or other considerations.

The latency time that is takes to access data is another aspect of the decision as to where and/or how to store data (block 206). As noted above, different storage machines may be able to respond to a retrieval request at different speeds. The particular speed at which a machine can respond to a retrieval request may be based on physical factors (e.g., disks are generally faster than tapes; some disks are faster than other disks; etc.). Additionally, the speed may be based on the way in which data is stored, independent of the physical capabilities of the machine. For example, if the data is organized in a hierarchical structure, retrieval may be relatively fast if the data is stored in a manner that preserves that structure. It is possible to flatten the data and to store it in the tables of a relational database (along with information from which the structure can be derived). However, when this type of storage is used it may be more computationally expensive to retrieve the data (and to derive its structure from the flat information), which may increase the retrieval time. Again, the choice of a particular storage mechanism may be driven by the applicable set of expectations on the latency time (whether those expectations are of commercial origin, regulatory origin, etc.).

Geography (block 208) is another example of a choice that may be made concerning data storage. As noted above, in some cases it makes sense to store plural copies of data in geographically diverse locations to guard the data against a disaster (e.g., fire, flood, etc.) that occurs in a particular one of the locations. As another example, some regulatory schemes may specify where the data is to be stored (e.g., national law may call for health care data to be stored in the country in which it originates, or within a set of countries that are part of a regional consortium). Conversely, some regulatory schemes (or even commercial expectations) may specify where data is not to be stored—e.g., a customer's legal department may specify that certain data is not to be stored in a particular country, in order to avoid subjecting that data to national laws that the customer finds to be onerous. There may be various factors that drive the decision of where, geographically, to store data.

Cost (block 210) is also an example of a choice that may be made concerning data storage. Different data storage resources are associated with different costs, and the amount of money to be expended on storing any particular data item may be based on a number of factors. For example, the customer that is paying for the data storage may have a limit as to how much the customer is willing to pay. Or the arrangement that is used for storage of data may be operated by the owner of the data, in which case lowering the cost of data storage may be one factor (but possibly not the only factor) in determining how the data is to be stored. As noted above, the cost of data storage may be affected by various issues, such as the type of equipment used to store the data, as well as the manner (e.g., structured versus flat) in which the data is stored.

FIG. 2 shows some example aspects of the different places and ways in which data may be stored, although the decision of where and how to store data may have aspects other than those shown in FIG. 2.

Figure 3:
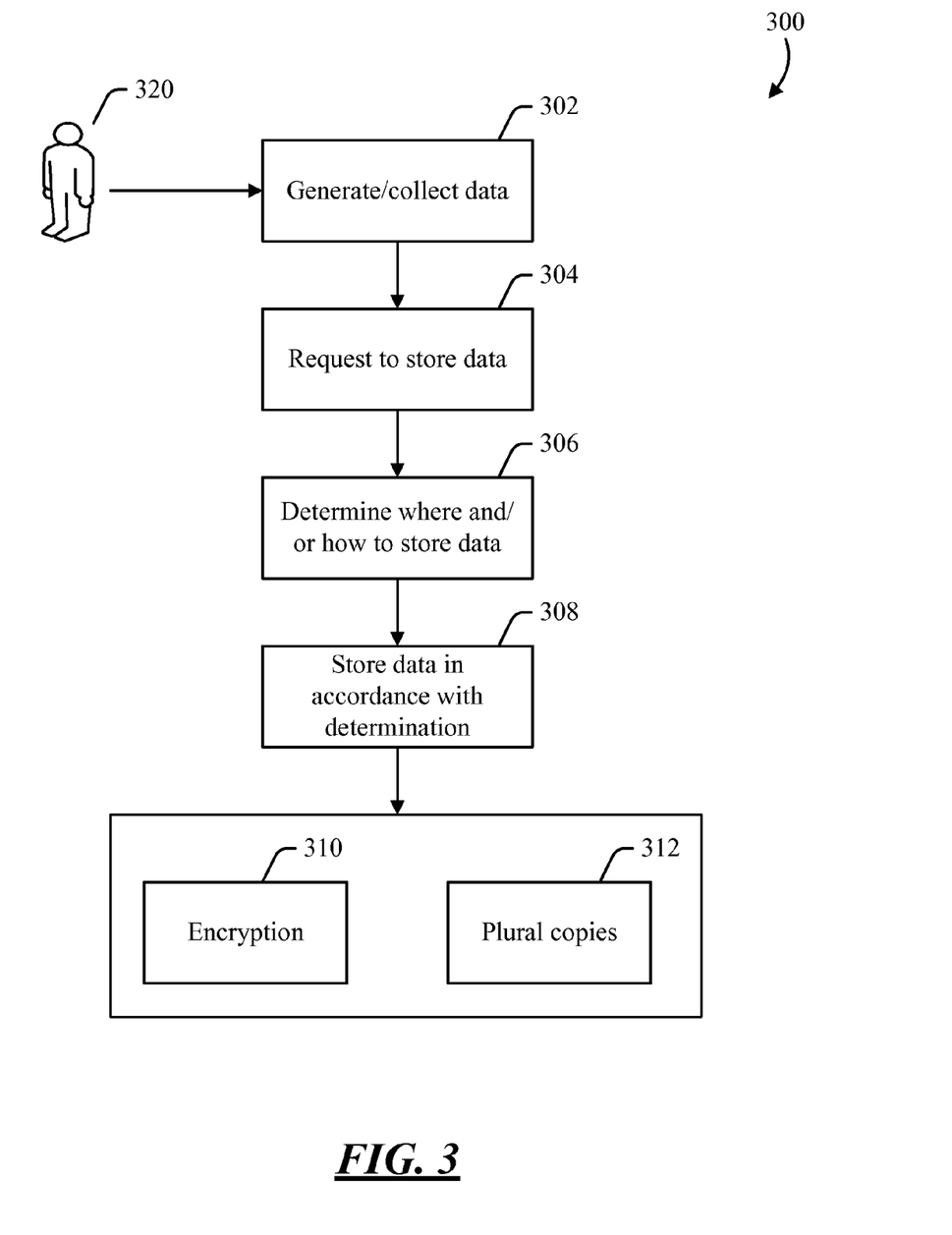
FIG. 3 is a flow diagram of an example process in which data may be stored using techniques described herein.
Figure 4:
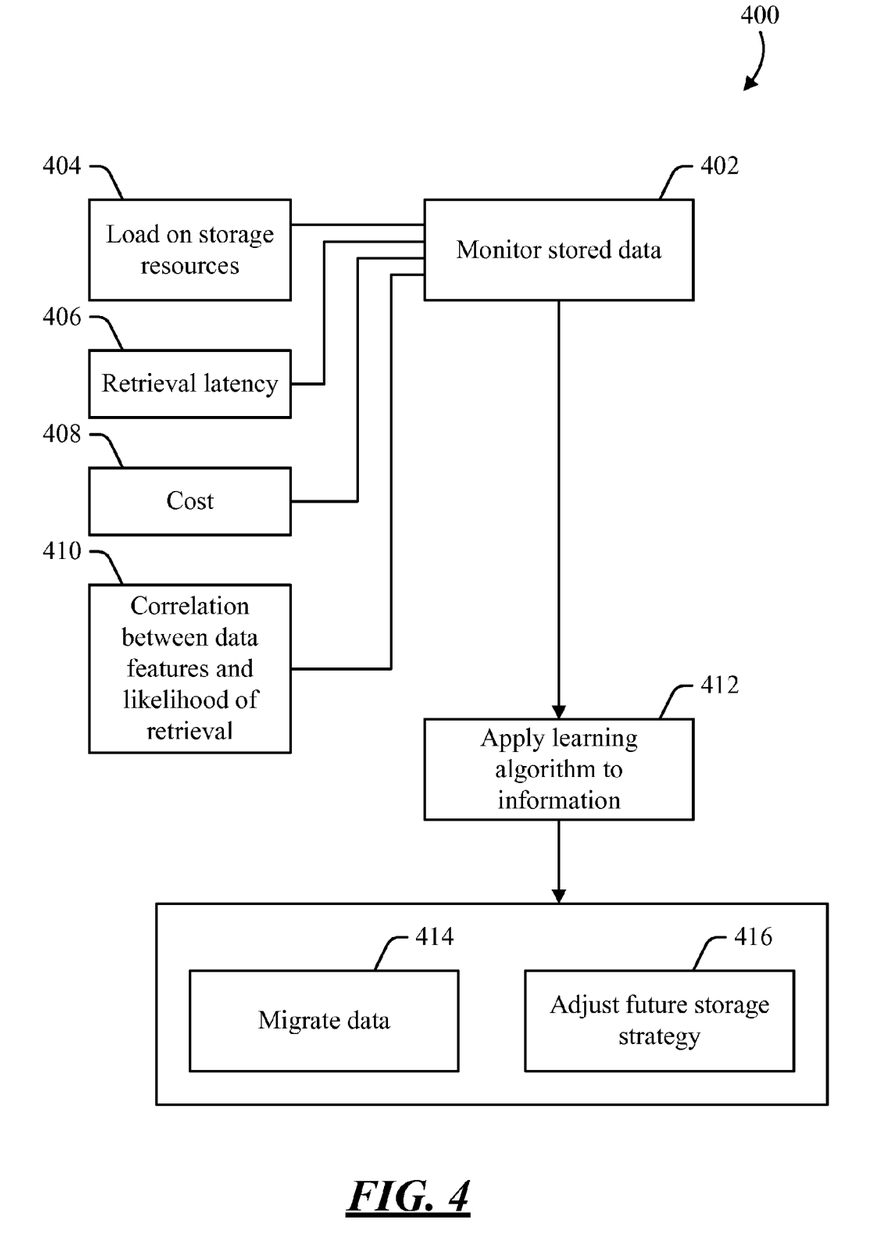
FIG. 4 is a flow diagram of an example process in which data may be monitored, and in which the storage of the data may be changed.

FIG. 3 shows an example process 300 in which data may be stored using techniques described herein. Before turning to a description of FIG. 3, it is noted that the flow diagrams contained herein (both in FIG. 3 and in FIG. 4) are described, by way of example, with reference to components or concepts shown in FIGS. 1-2, although the processes of these flow diagrams may be carried out in any system and are not limited to the scenarios shown in FIGS. 1-2. Additionally, each of the flow diagrams in FIGS. 3 and 4 shows an example in which stages of a process are carried out in a particular order, as indicated by the lines connecting the blocks, but the various stages shown in these diagrams may be performed in any order, or in any combination or sub-combination.

Returning to FIG. 3, at 302 data may be generated and/or collected. For example, application 102 (shown in FIG. 1) may generate data based on an interaction with a user and/or may collect data from that user. Any type of data could be generated or collected. In one example, the data that is generated and/or collected is medical or healthcare data, which describes or otherwise relates to a person's human body 320, or a treatment of human body 320. However, the data that is generated or collected at 302 is not limited to medical or healthcare data, and could be any kind of data.

At 304, a request may be made to store the data that was generated or collected. For example, with reference to FIG. 1, application 102 could issue a request to storage choice component 104 (which may then receive the request, as shown in FIG. 1).

At 306, a determination is made as to where and/or how to store the data. The decision may be made based on any of the factors discussed above, such as regulatory and/or commercial expectations, cost, speed of retrieval, expected frequency of use of the data, the level of security that is called for, achieving geographic diversity in the storage of several copies, or any other considerations.

At 308, the data may be stored in accordance with the determination that was made at 306. The storage of the data may involve various actions. In one example action, storage of the data involves encryption 310. As described above, the decision as to how to store the data may specify whether encryption is to be used and, if so, the particular strength of encryption, the particular algorithm, or any other aspect of encryption. In another example action, storage of the data may involve making plural copies of the data (at 312). As described above, sometimes the expectations for storage of data may involve making several copies to guard against data loss, and thus these copies may be made at 312. The copies could be stored in various ways—e.g., in several different storage resources, which may, for example, be in geographically-diverse locations.

As noted above, after data has been stored, the data may be monitored, and—based on the information that is collected through monitoring—the storage of the information may be changed. FIG. 4 shows an example process 400 in which data may be monitored, and in which the storage of the data may be changed.

At 402, the storage of data is monitored. Monitoring the storage of the data may involve collecting, from the various storage devices, information about those devices, as well as information about the data and its usage. Some examples of information that may be collected include the load on storage resources (block 404), the retrieval latency experienced at the various storage resources (block 406), the cost of storing data at the various storage resources (block 408), a correlation between some features of the data and the likelihood that the data will be retrieved (block 410), or any other information.

The load on the storage resources (block 404) may include information such as the number of network connections made to a resource, the average processor and/or disk utilization at that resource, etc. The retrieval latency (block 406) may be a measure of the time between the time that a request for data is received and the time that the request is fulfilled. The cost of using a storage resource (block 408) may include, for example, a measurement of the number of dollars per megabyte per month that it takes to store data at that resource. The correlation referred to in block 410 may, for example, be an assessment of how likely various pieces of data are to be retrieved, which may affect the determination of whether such data is to be stored in an expensive resource with a low retrieval latency, or an inexpensive resource with a high retrieval latency. If certain feature of the data are known (e.g., the type of the data, the age of the data, etc.), then it may be possible to observe a pattern about the use of that data. The pattern may reveal a correlation between certain features and the likelihood that the data will be retrieved. For example, if it is known that certain data contain images of X-rays, and the age of those X-rays are known, then it might be observed that very new X-rays are accessed frequently, but old X-rays are rarely accessed. In such a case, there is a correlation between the age and type of the data (where age and type are examples of two features), and the likelihood that the data will be retrieved.

The foregoing are thus some examples of the information that may be collected as part of a monitoring process, although any kind of information could be collected.

At 412, a learning algorithm may be applied to the data that is collected through the monitoring process, in order to determine what adjustments may be made to the way the data is stored. For example, if it is determined that the current way of distributing data across several storage resources (A, B, and C) has led to a bottleneck at one of the resources (e.g., at resource A), then it may be determined that too much data was directed to resource A, and the rules may be adjusted or tuned in a way that directs less data to resource A in the future. As another example, the learning algorithm may determine what types of data are (or are not) frequently accessed, and the rules may be adjusted to direct data that is not frequently accessed away from fast resources and toward slower resources. As yet another example, the learning algorithm may learn how certain resources have changed their performance over time. For example, if the network connection to a particular storage machine becomes faster over time, thereby causing that machine to have less of a network traffic bottleneck, the load information collected about that machine may reflect this change. The learning algorithm may then be able to detect the increase in network speed. So, to the extent that the machine might have been avoided in the past due to a slow response time, the learning algorithm may adjust the rules to direct more data to that machine if the machine's response time has been observed to increase.

The foregoing are some examples of adjustments to the storage rules that could be made by a learning algorithm, although it will be understood that the learning algorithm could adjust any parameters of the storage rules based on any observations about how the current storage is functioning.

Based on the learning algorithm, various actions may be taken with regard to the way data is stored. One example of such an action is to migrate existing data (at 414). Examples of data migration are described above. Another example action is to adjust the strategy by which future data is stored (at 416)—e.g., if it is determined that one storage resource has slowed down over time, then future incoming data that calls for fast retrieval may be directed away from that storage resource.

Figure 5:
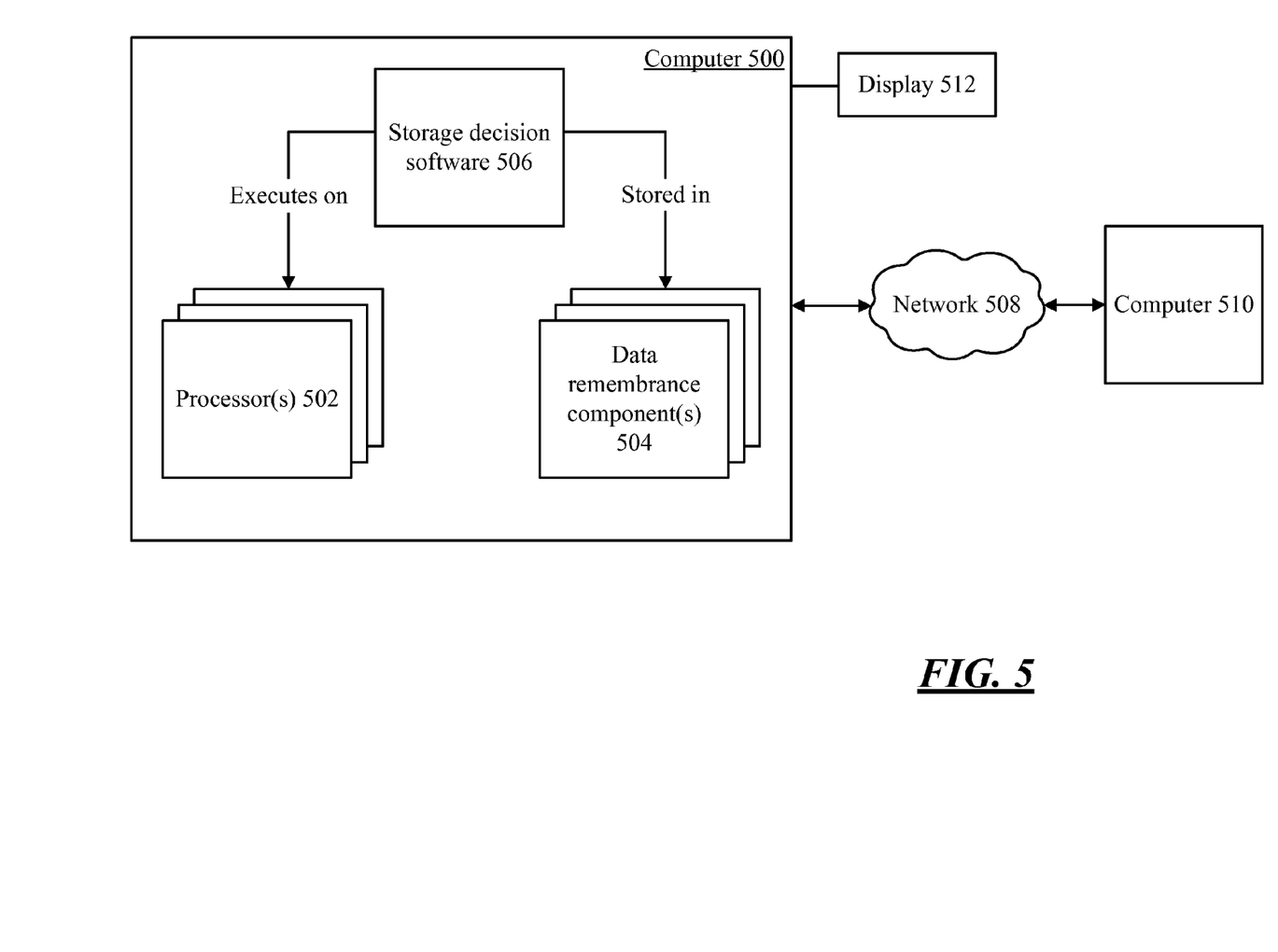
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is storage decision software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A personal computer, a server computer, or some other type of computer in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A system for storing data, the system comprising:
a plurality of storage resources;
a storage choice component that receives, from a source, a request to store said data, that chooses one or more of the storage resources in which to store said data, and that causes said data to be written to the one or more storage resources that have been chosen;
a database monitor that monitors said storage resources and that provides first information concerning said storage resources; and
a migration engine that makes changes to storage of said data based on said first information provided by said database monitor,
a locale-specific regulatory scheme determining where said data is to be stored and a level of encryption to be applied to said data, said storage choice component determining where to store data and how to encrypt said data based on said regulatory scheme and further based on a locale from which said data originates.

2. The system of claim 1, wherein said storage choice component determines that said data is to be encrypted, and causes said data to be stored in said storage resources in an encrypted form.

3. The system of claim 2, wherein said storage choice component determines an encryption algorithm and a length of a key that are to be used to encrypt said data, and causes said data to be encrypted with a key of said length using said encryption algorithm.

4. The system of claim 1, wherein said storage choice component determines a geographic constraint on storage of said data, and wherein said storage choice component causes said data to be stored in said one or more storage resources in accordance with said geographic constraint.

5. The system of claim 4, wherein said geographic constraint comprises a limitation on which country or countries said data is to be stored in, and wherein said storage choice component chooses said one or more storage resources based on said one or more storage resources being in said country or countries.

6. The system of claim 4, wherein said geographic constraint specifies a minimum amount of distance between different copies of said data, and wherein said storage choice component chooses said one or more storage resources based on each of said one or more storage resources being at least said distance apart from every other one of said one or more storage resources.

7. The system of claim 1, further comprising:
a rules engine that receives, from said storage choice component, second information concerning said data, and that provides, to said storage choice component, third information concerning where or how said data is to be stored, said storage choice component choosing said one or more storage resources based on said third information.

8. The system of claim 1, wherein a service level agreement determines an amount of time within which requests for said data are to be responded to, and wherein said storage choice component chooses a first one of said one or more storage resources based on which of said plurality of storage resources are able to respond to requests for said data within said amount of time.

9. The system of claim 1, wherein said migration engine determines that a first one of said one or more storage resources in which said data is stored is overloaded, and migrates said data from said first one of said one or more storage resources to a second one of said one or more storage resources.

10. The system of claim 1, wherein said migration engine determines, based on an age of said data, to move said data from a first one of said plurality of storage resources to a second one of said plurality of storage resources, said first one of said plurality of storage resources having a capability to respond to requests for said data in a first amount of time, said second one of said plurality of storage resources having a capability to respond to requests for said data in a second amount of time, said first amount of time being lower than said second amount of time.

11. The system of claim 1, wherein said storage choice component chooses said one or more storage resources based on costs associated with storing said data in said one or more storage resources.

12. The system of claim 1, said migration engine making a decision, based on a frequency of usage of said data, to change storage of said data from a structured form to a flat format.

13. One or more computer-readable storage media that store executable instructions that, when executed by a computer, cause the computer to perform acts comprising:
  receiving a request to store data;
  determining which storage resources are to be used to store said data, said determining being based on an expectation as to a reliability with which said data is to be stored, a cost of storing said data, or a constraint on where, geographically, said data is to be stored, said determining being further based on a locale-specific regulatory scheme that specifies where said data is to be stored and a level of encryption to be applied to said data, where to store said data and how to encrypt said data being chosen based on said regulatory scheme and further based on a locale from which said data originates; and
  storing said data in one or more of said storage resources in accordance with said determining.

14. The one or more computer-readable storage media of claim 13, wherein said acts further comprise:
  determining that a service level agreement calls for a number of copies of said data to be stored; and
  storing said copies such that each of said copies is stored in a different one of said one or more storage resources.

15. The one or more computer-readable storage media of claim 13, wherein said acts further comprise
  determining a constraint on a cost of storing said data; and
  choosing said one or more storage resources based on said constraint on said cost of storing said data.

16. The one or more computer-readable storage media of claim 13, said acts further comprising:
  determining whether to store said data in a flat format or in a structured format based on frequency of usage of said data.

17. A method of managing data, the method comprising:
  using a processor to perform acts comprising:
    storing data in one or more storage resources;
    monitoring said data in said one or more storage resources to collect information concerning an aspect of storage of said data;
    applying a learning algorithm to said information to identify adjustments to be made to a way in which said data is stored; and
    based on the adjustments that are identified by said learning algorithm, migrating said data from a first one of said one or more storage resources to a second one of said one or more storage resources.

18. The method of claim 17, wherein the method further comprises:
  using said processor to perform acts comprising:
    based on the adjustments that are identified by said learning algorithm, adjusting a strategy that is used to determine where or how data is stored at a future time.

19. The method of claim 17, further comprising:
  using said processor to perform acts comprising:
    identifying a correlation between a feature of said data and a likelihood that said data will be retrieved, said correlation indicating that data that has reached a certain age is less likely to be retrieved than data that has not reached said age; and
    determining that said data has reached said age, wherein said first one of said one or more storage resources provides faster retrieval of said data than said second one of said one or more storage resources.

20. The method of claim 17, said acts further comprising:
  using said processor to perform acts comprising:
    identifying a correlation between age of said data and a likelihood that said data will be retrieved, said correlation indicating that data that has reached a certain age is less likely to be retrieved; and
    determining not to migrate data from first one of said one or more storage resources to said second one of said one or more storage resources based on a finding that an increase in time to access said data is a detriment that is not offset by a reduced cost of storing said data in said first one of said one or more storage resources instead of in said second one of said one or more storage resources, said first one of said one or more storage resources providing faster retrieval of said data than said second one of said one or more storage resources, said first one of said one or more storage resources storing data for a lower cost than said second one of said one or more storage resources.

* * * * *